Patented June 2, 1953

2,640,366

UNITED STATES PATENT OFFICE 2,640,366

COATED BELT

Emil H. Knuth, Mentor, Ohio, assignor to Diamond Alkali Company, Cleveland, Ohio, a corporation of Delaware No Drawing. Application May 10, 1950, Serial No. 161,263

2 Claims. (Cl. 74—231)

This invention relates to power transmission belts combined with means to improve the traction properties thereof. This is a continuation-in-part of my co-pending application Ser. No. 32,271, filed June 10, 1948, and now abandoned.

Belts employed in power transmission systems customarily are manufactured from leather, cellulosic fibrous materials, such as canvas duck, or from a combination of canvas duck with natural or synthetic rubber. In order for these power transmitting belts to function properly and efficiently, it is necessary that the surfaces of such belts in contact with the driving surfaces of pulleys have a relatively high coefficient of friction, and moreover, that such belts be kept in a soft pliable condition in order that they fit snugly against the drive pulley and the driven pulley, in order that the belts present a maximum of power transmitting surface to such pulleys.

The problem presented by belts made from rubber is, for the most part, one of preserving good traction, since these belts are by their very nature substantially impervious to lubricating oils, and more over are destroyed or seriously damaged by such oils. However, belts made from fibrous materials are particularly sensitive to internal stresses caused by the continual flexing of the belt in service, which flexing in turn causes the fibers of the belt to move in contact with one another, thereby setting up internal friction which destroys the fiber structure and decreases the life of the belt. The problem of lubricating a leather or canvas belt internally, while simultaneously providing the surfaces of such belts with a sufficiently high coefficient of friction to prevent slippage of the belt upon the driving or driven pulleys, is therefore a material one.

Where natural oils or fats are applied to a belt of leather or canvas material in order to provide the necessary internal lubrication and to impart the degree of pliability which is necessary in order that the belt fit snugly against the driving or driven pulleys, the belt will necessarily slip upon these pulleys by virtue of the lubricated contact surfaces and a material amount of power loss thereby occurs. If such internal lubrication is not provided, internal friction, caused by the continual flexing of the belt in service, as noted hereinabove, will ultimately result in the destruction of the fibers of the belt and thereby materially shorten its useful life. Another factor is introduced where excessive amounts of natural oils and/or fats are applied to a belt in that a greater tension upon the belt is required than normally in order that the same amount of power may be transferred from the driving pulley to the driven pulley. This added strain upon the bearings of the pulleys, of course, increases wear and danger of breakdown at these points.

The prior art solution to these problems has with few exceptions been unsatisfactory and not at all simple. For the most part, the attention of the prior art workers has been directed to the obtaining of a relatively high coefficient of friction of the surfaces of leather and canvas belts in contact with driving and driven pulleys, while either ignoring or ineffectually attempting to lubricate such belts internally. Many of the prior art compositions have contained ingredients which, in fact, are detrimental to fibrous belt materials, an example of which is the relatively common substance, rosin or colophony, though the friction properties of this substance are very good. While rosin imparts a high coefficient of friction to fibrous belt surfaces, its high melting point (120–130° C.) and crystal-like form combined render its use upon such surfaces undesirable under working conditions, since the particles of this substance are destruction of the belting material. The net result of these prior art procedures has been the obtaining of relatively good traction, while at the same time causing an increased cost of replacement of the belting material or sacrificing good traction properties for excessive internal lubrication.

The present invention is directed to belts having improved traction properties, which include surface applied chlorinated paraffin wax, said chlorinated paraffin wax containing from 35% to 75% of chemically combined chlorine.

According to the present invention, the problem of an internally lubricated fibrous belt, which simultaneously has pulley contacting surfaces of improved traction properties, has been solved in a satisfactory and relatively simple manner. Where internal lubrication of the belting material is necessary, as, for example, in the belts manufactured from either leather or canvas, such internal lubrication is readily provided without destroying the relatively high coefficient of friction necessary to good traction, with the result that a maximum efficiency of power transfer by the surfaces of the belt in contact with such pulleys is obtained. Increased traction is also characteristic of the belts of this invention whether fashioned of canvas, leather or rubber, which may be natural or synthetic.

The belts of the present invention have the further advantage that the lubricating and dressing composition is non-inflammable and therefore will not, under conditions of high friction, where much heat is generated, or static electricity, where sparking may be encountered, present a fire hazard as in many prior art dressed belts and will at the same time impart flame-retardant properties to belts upon which they are used somewhat in proportion to the amount of the material applied.

Still another advantage obtains from the fact that the lubricating and dressing material of the present invention may be used in the form of solid, semi-solid paste or as liquid. In the solid form, it may be cast as a stick or bar, or it may be comminuted and applied to a belt in the form of a powder. In this latter form, it is especially effective when used on rubber belts, or previously lubricated canvas or leather belts. Because of the various forms in which it may be used, the lubricating and dressing material and the belts treated therewith may be adapted to a wide variety of conditions of use, depending upon the skill of the worker, the method of application, conditions under which a particular belt may be required to operate, and the like.

The chlorinated paraffin waxes suitable for use in the present invention, and containing an amount of chemically combined chlorine within the range of 35% to 75%, possess various degrees of viscosity, dependent upon the amount of chemically combined chlorine therein. For example, within the range of 35% to 55% of chemically combined chlorine, the chlorinated paraffin waxes are viscous liquids; from 55% to 65% of chemically combined chlorine, they vary from viscous liquids to semi-solids; and finally, from 65% to 75% of chemically combined chlorine, they are relatively hard resinous solids at room temperature, becoming somewhat plastic at 85–90° C. and viscous liquids at 95–100° C. The liquid chlorinated waxes, i. e., those materials containing from 35% to approximately 55% of chemically combined chlorine, while improving the traction of leather or canvas belts, particularly where sufficient time is allowed for the liquid materials to penetrate into the fibers of the belts, are more desirable as internal lubricants. The liquid materials may also be used as plasticizers for the semi-solid or resinous solid chlorinated paraffin waxes, especially where it is desired to have the belt dressing in a semi-solid paste, or readily fusible solid form, and especially for the combination of enhanced friction and internal lubrication which is provided. All of the chlorinated paraffin wax materials within the range of approximately 55% to 75% of chemically combined chlorine possess the property of increasing the coefficient of friction of surfaces to which they are applied. Hence, an increase in the traction of solid surfaces in contact with one another is obtained, where such surfaces have been thinly coated with these materials.

The chlorinated paraffin waxes containing from 35% to 75% of chemically combined chlorine may also be used in combination with other organic materials which have heretofore been found suitable as ingredients for belt dressing compositions. For example, the resinous solid or semi-solid materials may be used in combination with lubricating oils selected from the group consisting of animal or vegetable oils, possessing at least some degree of olefinic unsaturation, such as neat's-foot oil, castor oil, or the like, or they may be used in combination with waxes selected from the group consisting of animal or vegetable waxes, such as beeswax or carnauba wax. When these oils and waxes are employed in the liquid compositions of the present invention in conjunction with the solid chlorinated materials, sufficient time should be allowed after application to permit substantially complete penetration of the natural oils into the belt, thereby retaining a thin film comprising the solid chlorinated materials upon the traction surfaces thereof. Furthermore, in carrying the present invention into effect, it is preferred, where the situation indicates that oils or waxes, other than the chlorinated paraffin waxes, are to be used in combination with the chlorinated paraffin waxes, that such lubricating oils be selected from the classes indicated above for the reason that such oils and waxes contain at least some degree of olefinic unsaturation, which unsaturation is presently thought to impart a certain degree of stability to the chlorinated paraffin waxes under the conditions of use.

Where a fibrous belting material to be treated is either new or has become dried out during service, it is preferred that the belt dressing be in liquid or in semi-solid paste form, for example, a combination of a chlorinated paraffin wax containing between 35% and 55% of chemically combined chlorine with a natural oil, such as neat's-foot or castor oil, plus relatively minor amounts of a resinous solid chlorinated paraffin wax containing between 65% and 75% of chemically combined chlorine. Where the liquid form is preferred, the solid resinous chlorinated material need not be mixed with the combination of liquid chlorinated paraffin wax and animal or vegetable lubricating oil, but may instead be applied in powder form to the traction surfaces of the belt after it has been put into service. The semi-solid paste form may be made by combining suitable amounts of liquid chlorinated paraffin wax containing between 35% and 55% of chemically combined chlorine and a lubricating animal or vegetable oil, together with sufficient comminuted resinous solid chlorinated paraffin wax to bring the paste to the desired consistency.

The solid chlorinated paraffin wax materials have been found especially suitable where there is an indication of an immediate need for increased traction of the belt. Thus, where there are indications of slippage of a flat belt of rubber impregnated canvas, it has been found advantageous to apply a quantity of the comminuted solid resinous material, such as by blowing or dusting the powder onto the traction surfaces of the belt, while such belt is in use, until the indications of slippage have disappeared. Generally a very light dusting in this manner is sufficient to remove substantially all of the slippage due to contamination of the traction surfaces of the belt by relatively slight amounts of oil or other lubricant material. Where V-belts of rubber and fabric composition are involved and it is necessary to eliminate friction while such belts are in operation, it has been found suitable to dust the belts in the manner indicated above for the flat rubber belt, or to prepare a stick or bar of the solid resinous chlorinated paraffin waxes in combination with relatively minor amounts of a liquid chlorinated paraffin wax, such as that containing between 35% and 55% of chemically combined chlorine, together with some neat's-foot or castor oil or the like. The liquid materials of this composition have a tendency to lower the fusion point of the solid resinous chlorinated material, so that when the stick or bar is held in contact with the V-belt, the friction of the belt travelling over the stick or bar of the belt dressing material generates sufficient heat to fuse a small portion of the surface thereof and thereby deposit a very thin film of the dressing material upon the traction surfaces of the belt.

In order that those skilled in the art may better understand the present invention and the nature of the compositions of matter suitable for carrying the same into effect, the following specific examples are offered:

*Example I*

87½ parts of a chlorinated paraffin wax containing 70% of chemically combined chlorine and 13½ parts of a 1:1 mixture of beeswax and neat's-foot oil are combined in a suitable container and heated, while being agitated, to a temperature of approximately 110° C., until a uniform liquid mixture is obtained. This liquid, while still hot, is poured into a 6-inch paper tube, ½ inch in diameter, and allowed to cool and solidify. Thereafter, a portion of the paper tube is peeled off, exposing a suitable length of the stick of the belt dressing material. This exposed portion is placed in contact with a moving V-belt of rubber canvas combination. Fusion of the belt dressing material takes place where the moving belt comes in contact with the belt dressing stick and a thin, uniform film of the belt dressing material is deposited upon the belt.

*Example II*

70 parts of a chlorinated paraffin wax containing 40% of chemically combined chlorine are combined with 10 parts of neat's-foot oil and 20 parts of chlorinated paraffin wax containing 66% of chemically combined chlorine. This mixture is heated to approximately 110° to 120° C. with agitation until a uniform viscous liquid mixture is obtained and the mixture thereafter is allowed to cool. Upon cooling, it is found that the belt dressing composition thus prepared is a very viscous liquid. A portion of this material is applied by brushing to a used, dried-out, leather belt approximately ⅜ inch thick. The composition is left on the belt for a period of approximately 24 hours and it is found that the belt is noticeably more pliable than it was prior to this treatment and shows very good traction when in use under load. The traction of this belt is somewhat increased when comminuted chlorinated paraffin wax containing approximately 70% of chemically combined chlorine is applied to the traction surfaces of the belt by blowing a suspension of the chlorinated paraffin wax in air, and under slight pressure, onto these surfaces.

*Example III*

A portion of the liquid belt dressing as prepared in Example II is combined with comminuted chlorinated paraffin wax containing 65% of chemically combined chlorine, the amount of the comminuted chlorinated paraffin wax being about 1½ times the weight of the liquid material from Example II, by agitating the mixture until a thick viscous material of the consistency of putty is obtained. This mixture is applied to the traction surfaces of a leather belt by rubbing with cotton waste saturated with the belt dressing material. After allowing about 24 hours for the penetration of the lubricants into the belt fibers, there is an increased degree of traction of the belt when operating under load.

*Example IV*

A 1:1 mixture of carnauba wax and castor oil is substituted for the mixture of beeswax and neat's-foot oil in the composition of Example I; the same method of heating and agitating the mixture of chlorinated paraffin wax, carnauba wax, and castor oil is used. When this composition is cast into stick form, as in Example I, and applied to a moving belt, substantially the same results are thereby obtained.

*Example V*

A V-belt is driven by a variable speed cone pulley, the speed variations being obtained by means of pulleys of different diameters arranged concentrically upon an axle. Tension on the V-belt is maintained by means of a crown pulley held firmly against the apex of the belt by tension upon a spring actuated lever attached to the pulley. At low or high speeds, the apex of the V-belt rides the crown pulley in the region of the ends thereof. Slippage of the belt upon the crown pulley at low or high speeds results in the belt being disengaged from the crown pulley. Solid comminuted chlorinated paraffin wax containing 70% of chemically combined chlorine is applied to the belt; immediately thereafter, the belt rides smoothly in place upon the crown pulley without slippage, no disengaging therefrom taking place even after several months service without additional applications of chlorinated paraffin wax.

It will be apparent to those skilled in the art, particularly in view of the disclosure and of the specific examples hereinabove set forth, that other variations in dressed power transmission belts are possible within the spirit of the invention, and hence, that there has been obtained by the present invention a high degree of adaptability thereof to the myriad of situations prevailing in actual use. It will also be apparent to those skilled in the art that the active ingredients for imparting a greater degree of traction to belting materials in operation are the chlorinated paraffin waxes and that it is therefore possible to practice the teachings of the present invention without the necessity for here setting forth innumerable additional specific embodiments thereof which would necessarily result in undue prolixity of the present disclosure. Further, it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A power transmitting belt of improved traction properties, said belt having a fibrous base impregnated with a lubricating oil and a traction surface coating consisting of chlorinated paraffin wax containing from 35% to 75% of chemically combined chlorine, a portion of said chlorinated wax lying on the surface of said belt and a portion thereof being below the surface thereof.

2. A power transmitting belt as claimed in claim 1 wherein the chlorinated paraffin wax contains between 65% and 75% of chemically combined chlorine.

EMIL H. KNUTH.

References Cited in the file of this patent

UNITED STATES PATENTS

| Number | Name | Date |
|---|---|---|
| 2,326,233 | Leatherman | Aug. 10, 1943 |
| 2,496,745 | Olson | Feb. 7, 1950 |